United States Patent
Wydrinski et al.

(10) Patent No.: US 7,775,274 B2
(45) Date of Patent: Aug. 17, 2010

(54) METHOD FOR DETECTING FLUID LEAKAGE FROM A SUBTERRANEAN FORMATION

(75) Inventors: Ray Wydrinski, Houston, TX (US); Charles A. Christopher, Houston, TX (US)

(73) Assignee: BP Corporation North America Inc., Warrenville, IL (US)

(*) Notice: Subject to any disclaimer, the term of this patent is extended or adjusted under 35 U.S.C. 154(b) by 0 days.

(21) Appl. No.: 12/079,130

(22) Filed: Mar. 25, 2008

(65) Prior Publication Data

US 2008/0236816 A1   Oct. 2, 2008

Related U.S. Application Data

(62) Division of application No. 11/138,149, filed on May 26, 2005, now Pat. No. 7,380,598.

(51) Int. Cl.
*E21B 47/10* (2006.01)
*E21B 49/00* (2006.01)

(52) U.S. Cl. .................................. 166/250.08

(58) Field of Classification Search ............ 166/250.02, 166/250.08, 250.14, 191, 285, 253.1, 386; 73/152.08, 152.18, 152.42, 152.55; 324/324, 324/325; 702/12
See application file for complete search history.

(56) References Cited

U.S. PATENT DOCUMENTS

| | | | |
|---|---|---|---|
| 2,605,637 A * | 8/1952 | Rhoades | 73/152.55 |
| 2,874,347 A | 2/1959 | Southwick | |
| 3,059,696 A | 10/1962 | Lindsey | |
| 3,474,866 A | 10/1969 | Cobbs et al. | |
| 4,110,225 A | 8/1978 | Cagle | |
| 4,595,058 A | 6/1986 | Nations | |
| 4,896,724 A | 1/1990 | Hazlett et al. | |
| 5,907,662 A * | 5/1999 | Buettner et al. | 392/301 |
| 6,098,020 A * | 8/2000 | den Boer | 702/12 |
| 6,465,775 B2 | 10/2002 | Mullins et al. | |
| 6,478,086 B1 | 11/2002 | Hansen | |
| 7,380,598 B2 * | 6/2008 | Wydrinski et al. | 166/250.08 |
| 2002/0074489 A1 | 6/2002 | Mullins et al. | |
| 2003/0094281 A1 | 5/2003 | Tubel | |

(Continued)

FOREIGN PATENT DOCUMENTS

CA   1094799   2/1981

(Continued)

OTHER PUBLICATIONS

R.W. Klusman, "Rate Measurements and Detection of Gas Microseepage to the Atmosphere from an Enhanced Oil Recovery/sequestration Project, Rangely, Colorado, USA," Applied Geochemistry, 44/21 (Dec. 2003).

(Continued)

*Primary Examiner*—Kenneth Thompson
(74) *Attorney, Agent, or Firm*—John L. Wood; F. Lindsey Scott

(57) ABSTRACT

A method for the detection of a carbon dioxide leak from a plugged well extending from a surface of the earth to penetrate a subterranean formation which contains carbon dioxide by logging a collection chamber positioned in the plugged well.

6 Claims, 6 Drawing Sheets

U.S. PATENT DOCUMENTS

2006/0266520 A1    11/2006    Wydrinski et al.

FOREIGN PATENT DOCUMENTS

| JP | 06221949 | 8/1994 |
|---|---|---|
| JP | 2004219379 | 8/2004 |

OTHER PUBLICATIONS

J.L. Lewicki and C.M. Oldenburg, "Integrated Near-surface Monitoring and Analysis for CO2 Storage Verification," ACS Division of Fuel Chemistry, (Spring 2004).

R.L. Newmark, A.D. Ramirez and W.D. Dailey, "Monitoring Carbon Monoxide Sequestration Using Electrical Resistance Tomography (ERT), Sensitivity Studies," First National Energy Technology Lab. Carbon Sequestration National Conference, 1-18 (Feb. 11, 2001).

J.M Nordbotten, M.A. Celia, S. Bachu and H.K. Dahle, "Semianalytical solution for CO2 leakage through an abandoned well", Environ. Sci. & Tech., vol. 39, No. 2 (Jan. 15, 2005).

F.G. Oakes and J.T. White, "Electronic Measurement of CO2," 60th SPE Annual Technical Conference, Las Vegas (Sep. 25, 1985).

C.M. Oldenburg, J.L. Lewicki and R.P. Hepple, "Near-Surface Monitoring Strategies for Geologic Carbon Dioxide Storage Verification," PBO (Oct. 31, 2003).

T. Skov, H.G. Borgos, D.A. Halvorsen, T. Renden, L. Sonneland, R. Arts and A. Chadwick, "Monitoring and Characterization of a CO2 Storage Site," SEG, vol. 72, p. 1669-1672 (Jun. 11, 2002).

\* cited by examiner

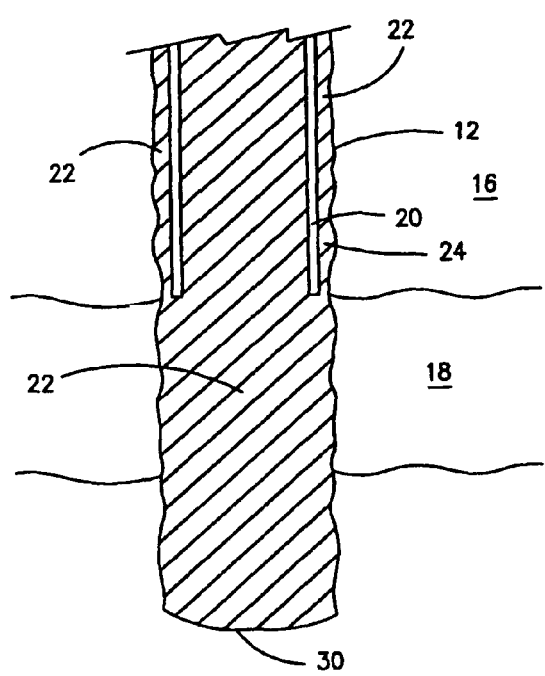 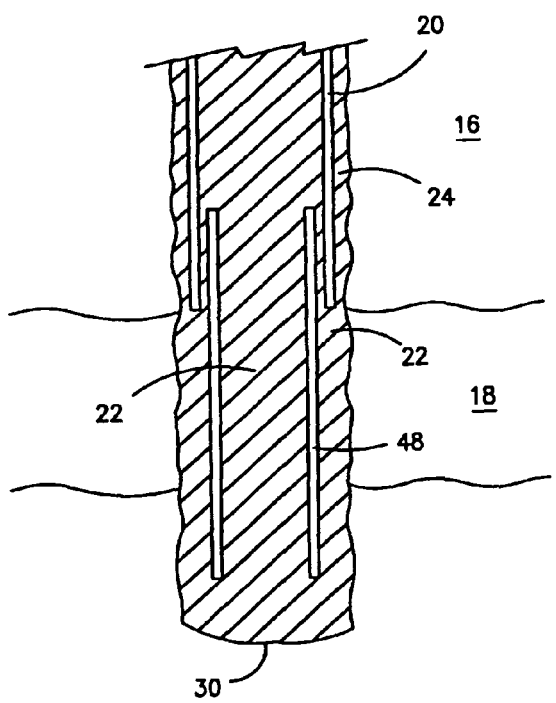
FIG. 2 PRIOR ART
FIG. 3 PRIOR ART

METHOD FOR DETECTING FLUID LEAKAGE FROM A SUBTERRANEAN FORMATION

This is a divisional of application Ser. No. 11/138,149 filed on May 26, 2005 now U.S. Pat. No. 7,380,598.

FIELD OF THE INVENTION

The present invention relates to a method for the detection of carbon dioxide leaks from plugged wells extending from a surface of the earth to penetrate a subterranean formation containing carbon dioxide.

BACKGROUND OF THE INVENTION

In recent years, the presence of carbon dioxide in the atmosphere has become an increasing ecological concern. While the carbon dioxide in the atmosphere can have many sources, one source is the release of carbon dioxide into the air as leakage from wells penetrating subterranean carbon dioxide-containing formations.

Such formations may contain carbon dioxide as a result of naturally-occurring in situ carbon dioxide, from use of the well as a carbon dioxide injection/disposal well, from use of the well as either an injection or a production well in a carbon dioxide enhanced oil recovery process, and the like. There are a variety of reasons why subterranean formations containing carbon dioxide are desirably isolated so that the carbon dioxide does not flow into the atmosphere. The most commonly used technique for isolating such formations is plugging the wells penetrating the formation containing carbon dioxide. This is most commonly accomplished by cementing the wells shut.

Of continuing concern is whether the cement plug, or other plugging material, has fully plugged the well and whether it continues to block the carbon dioxide from flowing upwardly through the well into the atmosphere. Should leaks occur, the source of leaks into the atmosphere can be through or around the cement plugging, which cements the casing in place in the wellbore, or through or around the cement plugging the inside of the casing, which is typically used to case the well from the earth's surface to or through the carbon dioxide-bearing formation.

Various techniques have been used in the past for carbon dioxide measurement. These techniques include near infra red or other light absorption techniques and the like for the detection of carbon dioxide in flowing gas streams. However, such techniques are not effective for the detection of very minute quantities of carbon dioxide released on a continuing basis. Accordingly, an improved method for detecting carbon dioxide leakage from plugged wells has long been sought.

SUMMARY OF THE INVENTION

The present invention comprises a method for the detection of a carbon dioxide leak from a subterranean formation containing carbon dioxide by logging a collection chamber positioned in the plugged well above the subterranean formation.

According to the present invention, a method is provided for detecting a carbon dioxide leak from a plugged well extending downwardly from a surface of the earth and penetrating a subterranean carbon dioxide-containing formation by forming a collection chamber across a cross sectional area of the plugged well above the carbon dioxide-containing formation, sealingly positioning a tubing to extend through the collection chamber and to the surface, and passing a carbon dioxide detecting apparatus through the tubing and at least partially through the collection chamber to detect carbon dioxide in the collection chamber.

The invention further comprises a method for detecting a carbon dioxide leak from a plugged well extending from a surface of the earth and penetrating a subterranean formation containing carbon dioxide, the well comprising a wellbore containing a casing extending through an impermeable zone and being cemented in the wellbore by cement positioned in an annulus between the outside of the casing and the inside of the wellbore by forming a collection chamber in fluid communication with the inside of the casing and the cement in the annulus above the formation containing carbon dioxide; sealingly positioning a tubing to extend through the collection chamber and to the surface; and, passing a carbon dioxide detecting apparatus through the tubing and at least partially through the collection chamber to detect carbon dioxide in the collection chamber.

The invention also comprises a method for detecting a carbon dioxide leak from a plugged well extending downwardly from a surface of the earth and penetrating a subterranean carbon dioxide-containing formation, the method comprising forming a collection chamber across a cross sectional area of the plugged well above the carbon dioxide containing formation, positioning a cap member across an upper end of the collection chamber, sealingly positioning a tubing to extend from the surface to operatively engage the cap member, and passing a carbon dioxide detecting apparatus through the tubing above the cap member to detect carbon dioxide in the collection chamber.

BRIEF DESCRIPTION OF THE DRAWINGS

FIG. 2 and FIG. 3 are alternate schematic embodiments of methods for plugging a well penetrating a carbon dioxide-containing formation;

DETAILED DESCRIPTION OF THE INVENTION

In the description of the Figures, the same numbers will be used throughout to refer to the same or similar components.

Figure 1:
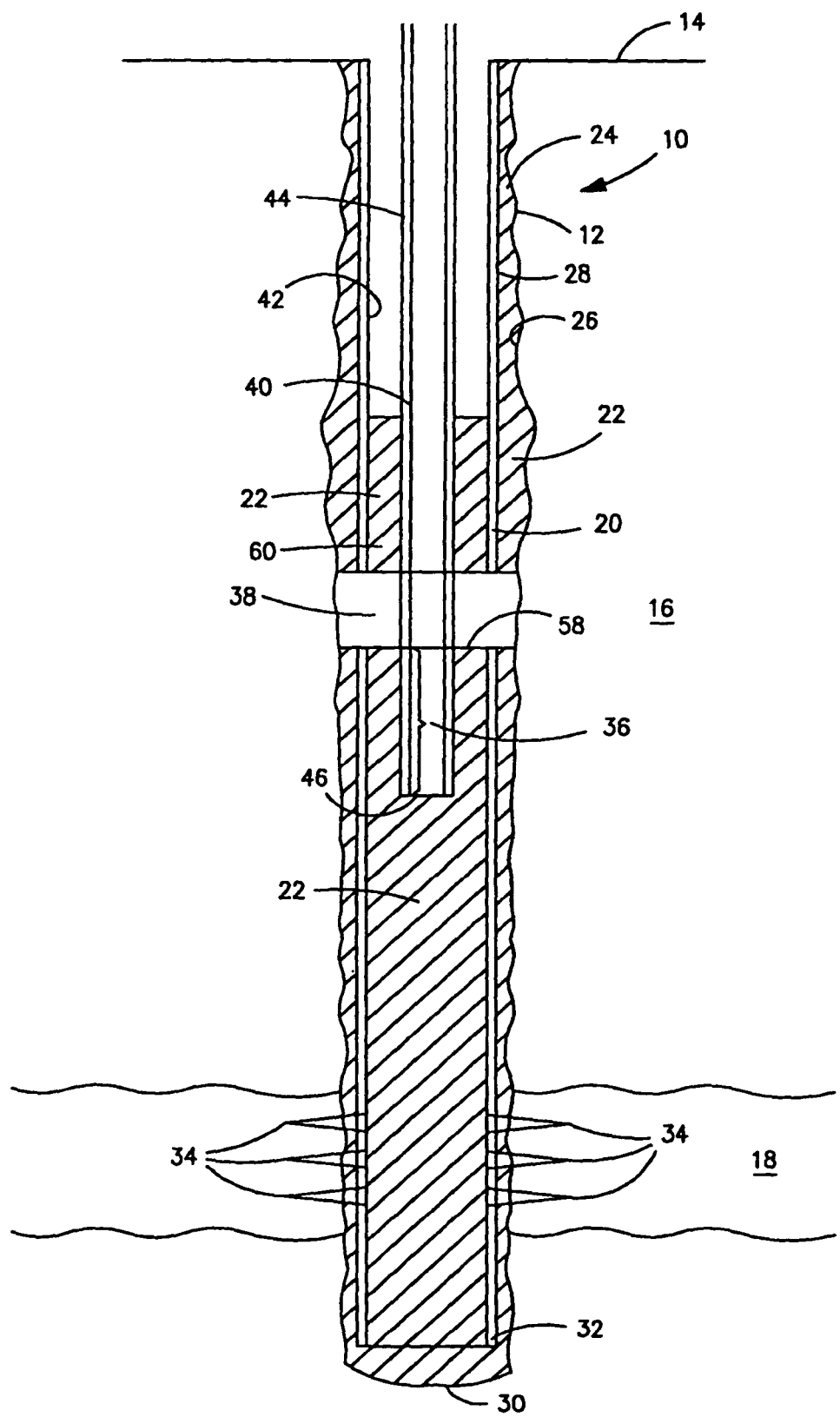
FIG. 1. is a schematic diagram of a wellbore extending from an earth surface through a subterranean carbon dioxide-bearing formation and including a collection zone according to the present invention.

In FIG. 1, a well 10 is shown and comprises a wellbore 12 extending from a surface 14 through an overburden 16 and penetrating a carbon dioxide-containing formation 18. Well 10 includes a casing 20, which is cemented in place by cement 22 and which could be used to produce fluids from formation 18. In FIG. 1 the casing extends to near a bottom 30 of wellbore 12 and ends at a lower end 32 of the casing. Typically fluids recovered from formation 18 could comprise hydrocarbons alone, hydrocarbons in combination with aqueous fluids, hydrocarbon gases and the like. Alternatively, well 10 could be used to inject carbon dioxide, aqueous surfactants or the like into formation 18 for the recovery of hydrocarbons or the like. Alternatively, carbon dioxide could be injected into formation 18 for disposal of carbon dioxide up to a selected limit.

Well 10, as shown in FIG. 1, has been plugged to prevent the escape of carbon dioxide from formation 18. Cement 22, as shown, is typically used to position casing 20 in wellbore 12 by positioning the casing in the wellbore and thereafter injecting cement into an annulus 24 between an outside 28 of casing 20 and an inside 26 of wellbore 12. This cement desirably fills annulus 24 between the outside 28 of casing 20 and the inside 26 of wellbore 12. This cement is positioned with the objective of preventing the movement of fluids between the outside of casing 28 and the inside of wellbore 26. Well 10, as shown, has been perforated in formation 18 by perforations 34 to permit the flow of fluids into or from formation 18 during use of well 10.

Well 10, as shown, has been plugged with cement 22 to a top 58 of a cement layer which ends at a collection chamber 38, which is formed across a cross sectional area of wellbore 12. The collection chamber is positioned to collect carbon dioxide or other materials which are fluid and may flow upwardly from formation 18 through cement 22 inside casing 20 or up annulus 24. These fluids are allowed to accumulate in collection chamber 38 and the fluids are periodically tested to determine whether carbon dioxide has moved into collection chamber 38. Well 10 is sealed above collection chamber 38 by additional cement in the annulus and in a second annulus 60 between an inside 42 of casing 20 and an outside 44 of a tubing 40 which is positioned to extend from surface 14 downwardly through well 10 through collection chamber 38 and for a selected distance 36 below collection chamber 38 and ends at a lower end 46 of the tubing.

By the operation of the present method a selected time is allowed to pass with any fluids which may be migrating upwardly through well 10 being collected in collection chamber 38. Thereafter a carbon dioxide detecting apparatus is passed downwardly through tubing 40 and through collection chamber 38. The space 36 below collection chamber 38 is desirable to permit operation of the carbon dioxide detecting apparatus. The carbon dioxide detecting apparatus may be one of a variety of logging tools, such as a pulse neutron logging tool, a neutron logging tool, an acoustic logging tool, a resistivity logging tool with a wireline, memory, downhole battery, fiber optics, radio transmission, pressure sensing, temperature, or other data transmission system. Such systems and tools are considered to be capable of detecting the presence of carbon dioxide in collection chamber 38, especially when calibrated by the use of known carbon dioxide concentrations in chambers such as collection chamber 38.

Desirably collection chamber 38 includes particulate matter such as sand, gravel or the like (not shown) which is desirably of a composition different than the materials making up formation 18. This enables the logging tool to more accurately detect the zone which comprises the collection chamber as the log is passed upwardly and downwardly through tubing 40. By these techniques the presence of carbon dioxide can be detected. Since collection chamber 38 is sealed by cement above the collection chamber, the collection chamber accurately detects the presence of carbon dioxide moving upwardly through well 10 by concentrating it in collection chamber 38. The use of the particulate material in chamber 38 also facilitates the calibration of the logging tool to detect carbon dioxide in combination with the specific particulate material used. Wide variations in the particulate material used are possible, as known to those skilled in the art.

In FIGS. 2 and 3, alternate methods for plugging formation 18 are shown. In FIG. 2, formation 18 is an open hole completion through formation 18 and has been plugged by placing cement in the open hole area as well as in the casing above the open hole area. Cement has been used to close annulus 24 as discussed above.

In FIG. 3, a sleeve 48 has been positioned over formation 18 with cement then being positioned behind sleeve 48 to close formation 18, with the cement then being positioned inside sleeve 48 and casing 20. Annulus 24 has typically been plugged previously with cement as discussed above. A wide variety of plugging completions are considered to be known to those skilled in the art and all are suitable for use in the method of the present invention.

Figure 4:
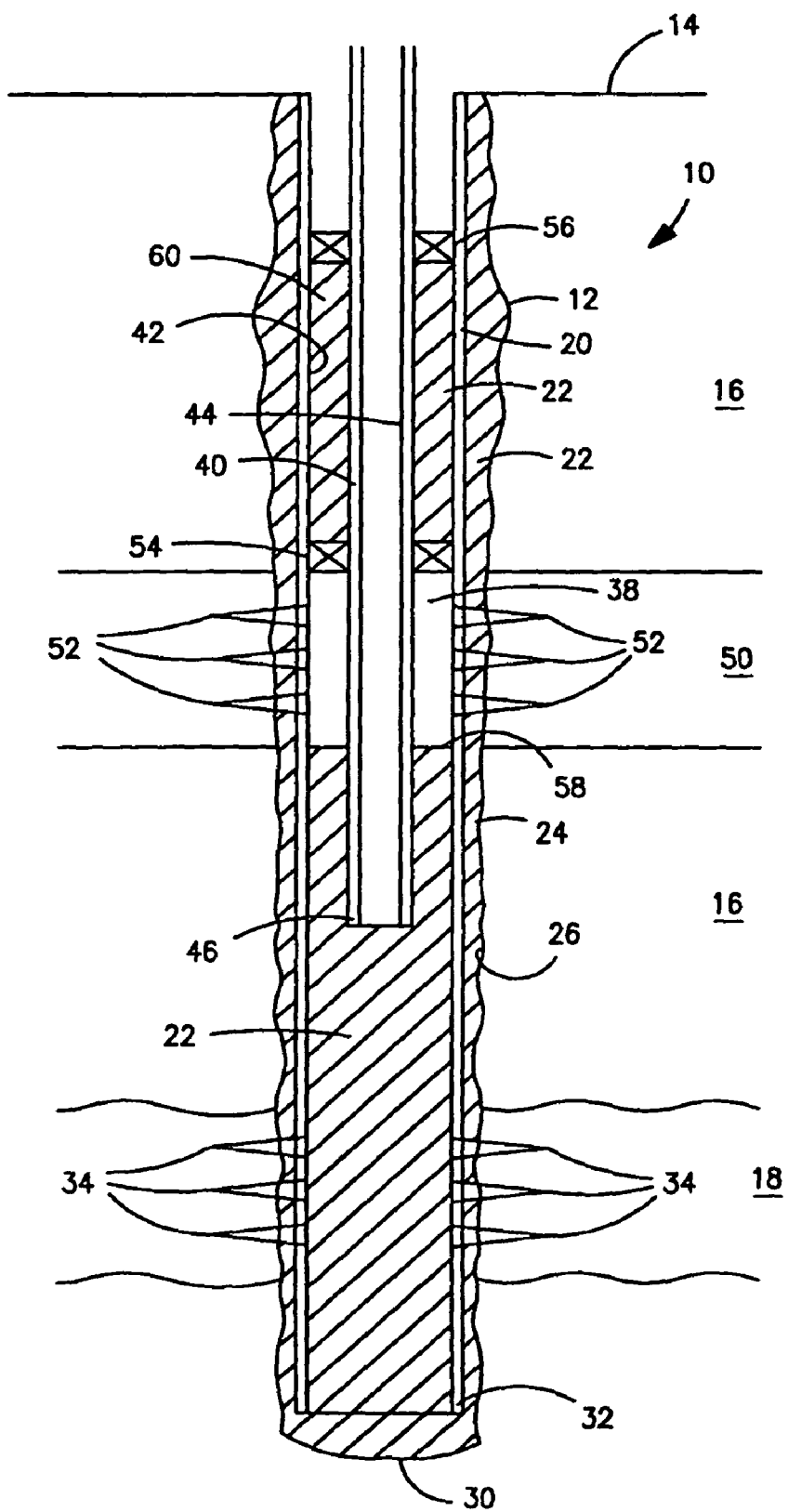
FIG. 4. is a schematic diagram of an alternative embodiment of the present invention.

In FIG. 4, an alternate method for forming collection chamber 38 is shown wherein the collection chamber is placed in an impermeable formation 50 positioned in the overburden 16. By use of this formation, perforations 52 can be placed through casing 20 and extended into formation 50 from which no gases are produced. The perforations provide a flow path for any fluids which may be moving upwardly through annulus 24 from formation 18. Similarly, gases which are moving upwardly through the cement inside casing 20 also accumulate in collection chamber 38 and are measured, as discussed previously, by the use of logging tools in tubing 40. Desirably, the lower end 46 of tubing 40 is sealed by either the use of a fabricated sealing member across lower end 46 of tubing 40 or by its position in cement inside casing 20. The detection of the carbon dioxide in FIG. 4 is accomplished in the same way used in FIG. 1. One additional difference in FIG. 4 is that packers 54 and 56 are used to position cement in well 10 above collection zone 38, as known to those skilled in the art.

Figure 5:
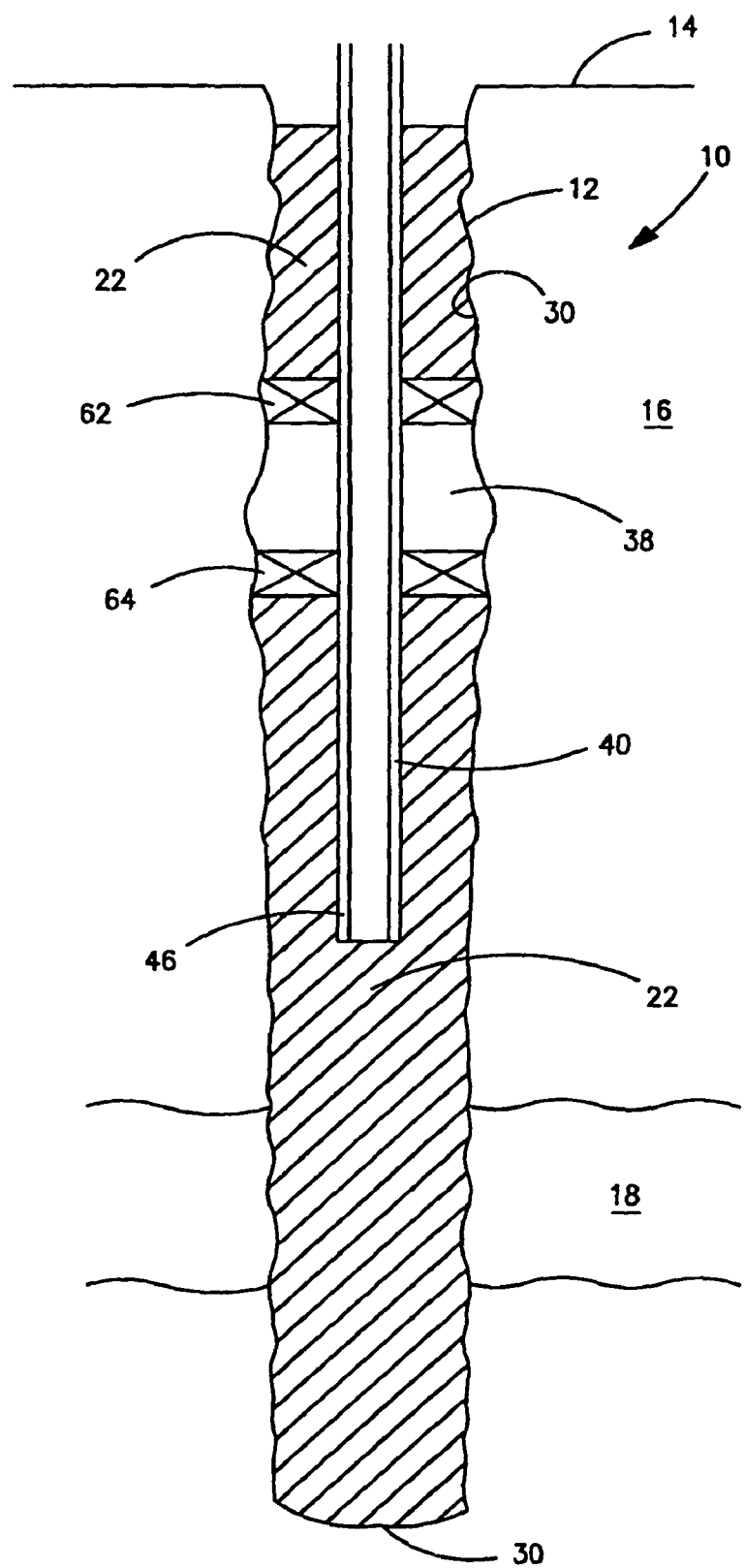
FIG. 5 is a further schematic diagram of a further embodiment of the present invention.

In FIG. 5, a further embodiment of the present invention is shown wherein packers 62 and 64 are used to position cement above and below a collection chamber 38. The use of packers for such an application is well known to those skilled in the art and the carbon dioxide is detected in collection chamber 38, as discussed in conjunction with FIG. 1. FIG. 5 shows the use of the method of the present invention in an uncased well.

Figure 6:
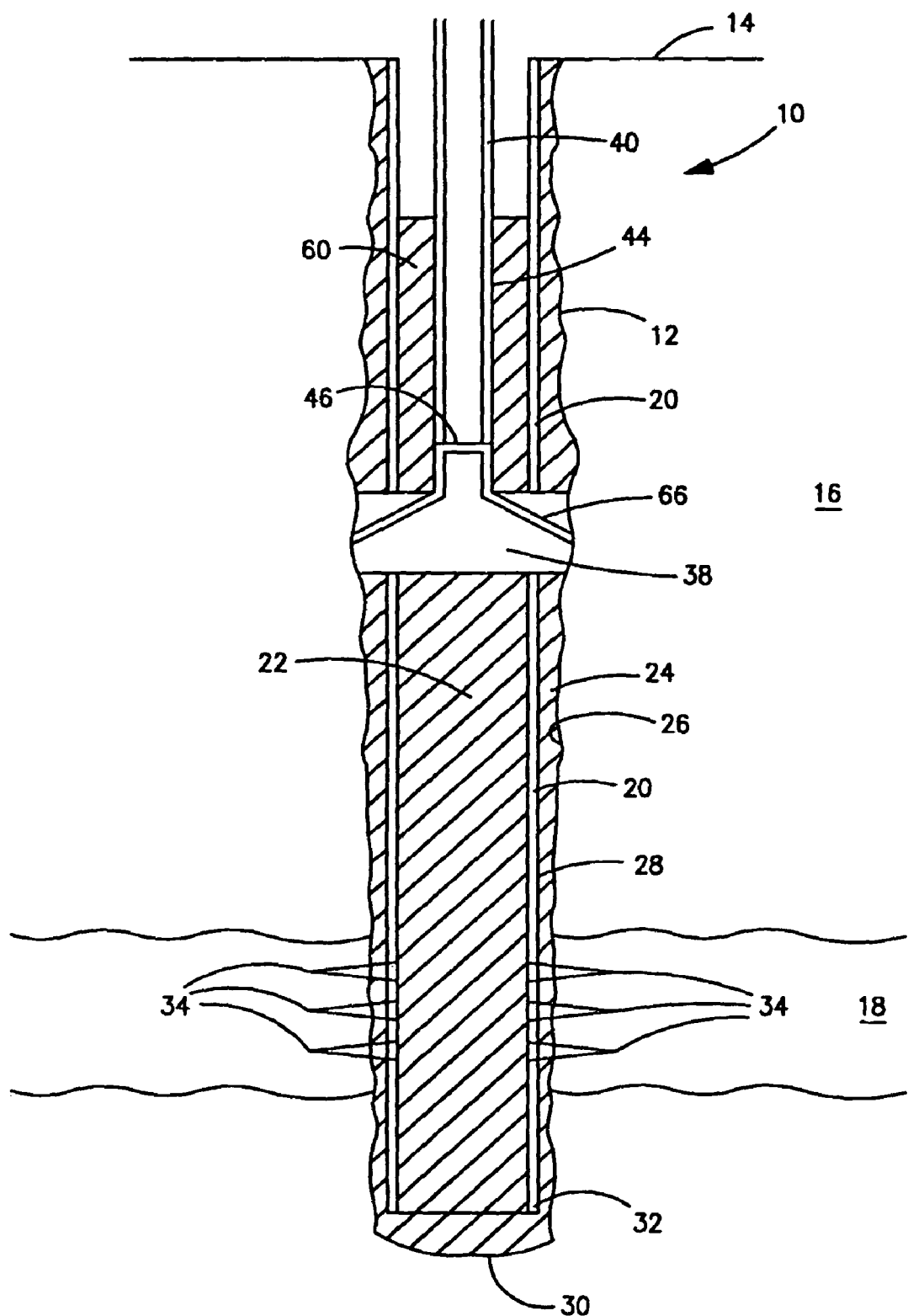
FIG. 6 is a schematic diagram of a further embodiment of the present invention; and, FIG. 7 is a schematic diagram of another embodiment of the present invention.

In FIG. 6, an alternate embodiment of the present invention is shown wherein a collection chamber 38 is positioned across a cross section of a well 10. Collection chamber 38 includes a funnel or cap member 66 positioned to allow lighter components collected in collection chamber 38 to rise to a top of funnel 66. Funnel 66 is closed at its top end and is in operating engagement with tubing 44 so that logging measurements of fluids trapped in collection chamber 38 are accomplished through the bottom of tubing 44 and a top of funnel 66.

Figure 7:
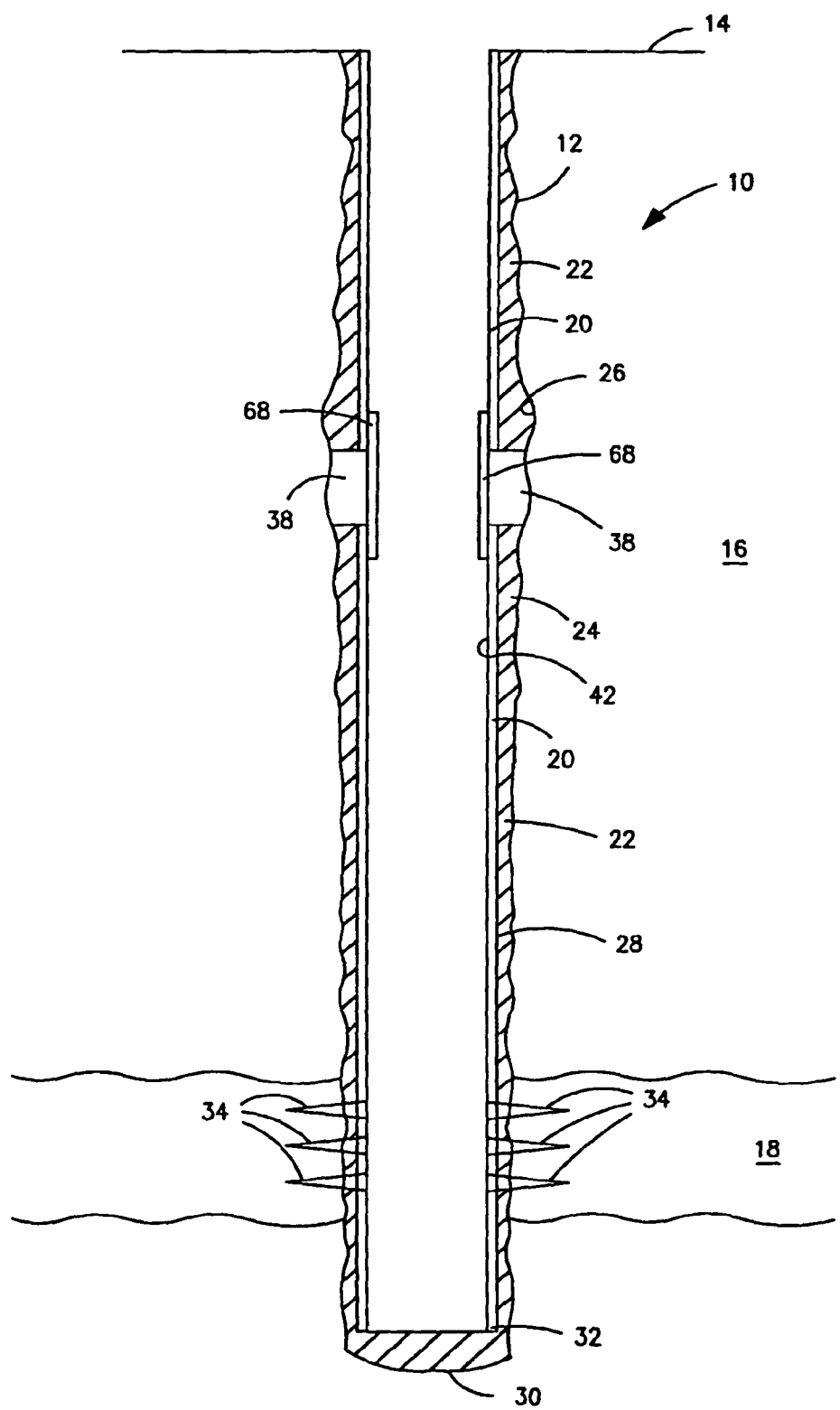

In FIG. 7, a further embodiment is shown wherein a collection chamber is positioned between the outside of the casing and inside of the wellbore. In this embodiment, a cavity is formed by milling or the like through the casing and the cement surrounding the casing in the wellbore to produce a collection chamber 38. The collection chamber is then completed by positioning a sleeve 68, which may be of any suitable sleeve material, expandable casing material or the like, to sealingly separate the collection chamber from the inside of the casing. The chamber then collects gases, other light vapors or fluids which may be rising through the cement closing the annulus between the outside of the casing and the inside of the wellbore. The presence of carbon dioxide is readily detected by passing a logging tool down the casing and through an area in the casing adjacent to the collection chamber to determine whether carbon dioxide has collected in the collection chamber.

The well may be produced during the period when gases are collecting in the collection chamber by a tubing positioned through the casing and extending to the vicinity of formation 18. The tubing may be removed as desired to pass a logging tool through the casing to determine whether carbon dioxide has collected in chamber 38. Production or injection through a tubing may then be resumed or alternatively the tests of chamber 38 for carbon dioxide may be conducted when it is convenient to remove the tubing for production or injection reasons. In any event, this embodiment allows the detection of carbon dioxide which may be escaping from a carbon dioxide-containing formation through the annular space between the outside of the casing and inside of the wellbore. It will be understood that with this and other embodiments, that not only may a carbon dioxide-containing formation 18 be penetrated by the well, but other formations from which hydrocarbons or other materials are produced or into which other materials are injected may be penetrated by the well. In other words, carbon dioxide-containing formation may lie above, below or between formations into which fluids are injected or from which fluids are produced. Such formation characteristics are well known to those skilled in the art. In view of the current concern about carbon dioxide in the atmosphere, it is desirable to be able to determine whether carbon dioxide is being lost from the carbon dioxide-containing formation into the atmosphere through the annular space or through plugged wells as discussed above.

A wide variety of configurations is possible within the scope of the present invention for the detection of leaks from a plugged well. In such embodiments, it is necessary that a collection chamber be positioned to intercept all sources for leaks of fluids upwardly through well 10 from formation 18. These fluids are then detected by the use of a logging system through tubing 40 or through an end 44 of tubing 40. Logging techniques such as those generally used in oil wells are effective for logging through tubing 44. The presence of particulate matter in the collecting chamber enables the use of the particulate material to produce a signal unique to the particulate material in the collection chamber.

Further, the material may be selected to act as an absorbent, to a certain extent, of the fluids produced upwardly through well 10. The logging detection of fluids passed upwardly through well 10 is anticipated to be done relatively rarely unless a substantial leak is detected. The use of the collection chamber permits the use of logging techniques to determine whether leakage is occurring and to determine the magnitude of the leakage over periods of time.

As discussed above, typically wells may be completed either open hole, i.e., with no casing, and produced open hole via tubing or otherwise as known to those skilled in the art. Such completions are relatively rare with cased completions and particularly at least partially cased completions being more frequently used. The method of the present invention is useful with either type of well and requires a collection chamber be positioned across the cross-sectional area of the well in the path of the migration of fluids upwardly from formation 18. A variety of configurations can be used, as known to those skilled in the art. Further the completion of wells of the configurations discussed above is readily accomplished by those skilled in the art by techniques such as, two-phase cementing, gravel packs, packers, external casing packers and a variety of other known cementing and completion techniques.

The specific method selected for the formation of the collection chamber in the well is not considered to constitute a portion of the present invention, which is directed to the use of the collection chamber in determining whether carbon dioxide is escaping from the carbon dioxide-containing formation below the collection chamber.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

The invention claimed is:

1. A method for detecting a fluid leak from a plugged well extending downwardly from a surface of the earth and penetrating a subterranean fluid-containing formation, the method comprising:
    a) forming a collection chamber across a cross sectional area of the plugged well above the fluid containing formation;
    b) positioning a cap member across an upper end of the collection chamber;
    c) sealingly positioning a tubing to extend from the surface to operatively engage the cap member; and,
    d) passing a fluid detecting apparatus through the tubing and into operative engagement with the cap member to detect fluid in the collection chamber.

2. The method of claim 1 wherein the well is a cased well.

3. The method of claim 1 wherein the collection chamber contains a particulate material.

4. The method of claim 1 wherein the fluid comprises carbon dioxide.

5. A method for detecting a fluid leak from a well extending from a surface and penetrating a subterranean formation containing the fluid, the well comprising a wellbore containing a casing extending through an impermeable zone and being cemented in the wellbore by cement positioned in an annulus between an outside of the casing and an inside of the wellbore, the method comprising:
    a) forming a collection chamber in the annulus above the formation containing the fluid; and,
    b) passing a fluid detecting apparatus through the casing and at least partially through an area in the casing adjacent to the collection chamber to detect the fluid in the collection chamber.

6. The method of claim 5 wherein the fluid comprises carbon dioxide.

* * * * *